United States Patent
Weksler

(10) Patent No.: US 9,875,491 B2
(45) Date of Patent: Jan. 23, 2018

(54) SYSTEMS AND METHODS FOR FACILITATING LENDING BETWEEN TWO OR MORE PARTIES

(75) Inventor: Michel Weksler, Albany, CA (US)

(73) Assignee: PayPal, Inc., San Jose, CA (US)

(*) Notice: Subject to any disclaimer, the term of this patent is extended or adjusted under 35 U.S.C. 154(b) by 1737 days.

(21) Appl. No.: 11/135,781

(22) Filed: May 24, 2005

(65) Prior Publication Data
US 2006/0149665 A1 Jul. 6, 2006

Related U.S. Application Data

(60) Provisional application No. 60/640,937, filed on Dec. 30, 2004.

(51) Int. Cl.
G06Q 40/00 (2012.01)
G06Q 30/06 (2012.01)
G06Q 40/02 (2012.01)

(52) U.S. Cl.
CPC ........... *G06Q 30/06* (2013.01); *G06Q 40/025* (2013.01)

(58) Field of Classification Search
USPC ..................... 705/38, 39; 235/379
See application file for complete search history.

(56) References Cited

U.S. PATENT DOCUMENTS

| | | |
|---|---|---|
| 5,778,178 A | 7/1998 | Arunachalam |
| 5,870,721 A * | 2/1999 | Norris ............. G06Q 20/10 705/35 |
| 5,940,812 A * | 8/1999 | Tengel et al. ............... 705/38 |
| 5,987,500 A | 11/1999 | Arunachalam |
| 6,212,556 B1 | 4/2001 | Arunachalam |
| 6,385,594 B1 * | 5/2002 | Lebda ................ G06F 17/243 705/35 |
| 7,587,504 B2 * | 9/2009 | Adams et al. ............... 709/229 |

FOREIGN PATENT DOCUMENTS

WO WO-2006/071998 A2 7/2006

OTHER PUBLICATIONS

Syndication Loan-Glossary, "http://www.loan-market-assoc.com/uploads/files/Syndicated_Loan_glossary.pdf" pp. 1-15.*
Wells Fargo—Syndicated Financial Services—https://www.wellsfargo.com/com/bus_finance/syndications.*
Xinhua News Agency ("Philippines Seeks 3 Billion Dollars in Fresh Loans", Jan. 3, 1998).*
Armendariz De Aghion, Beatriz, et al., "Microfinance beyond group lending", *Economics of Transition*, vol. 8, No. 2, (2000),401-420.
Brau, James C., et al., "Microfinance: A Comprehensive Review of the Existing Literature and an Outline for Future Financial Research" *Forthcoming in Journal of Entrepreneurial Finance and Business Ventures*, 1-44.
Chatterjee, Prabirendra, et al., "Social Identity and Group Lending", (Jan. 2004),1-24.
Conning, Jonathan, "Outreach, sustainability and leverage in monitored and peer-monitored lending", *Journal of Development Economics*, vol. 60, (1999),51-77.

(Continued)

*Primary Examiner* — Olabode Akintola
(74) *Attorney, Agent, or Firm* — Haynes & Boone, LLP

(57) ABSTRACT

A method and a system for facilitating lending between private parties, the private parties including a lendee and at least one lender. For example, a loan request from a lendee may be received, the loan request sent to at least one lender, the lender indicating acceptance of the loan request, notifying the lendee of the acceptance and transferring funds from a financial account of the lender to a financial account of the lendee.

14 Claims, 10 Drawing Sheets

(56) References Cited

OTHER PUBLICATIONS

Genicot, Garance, et al., "Group Formation in Risk-Sharing Arrangements", *Forthcoming, Review of Economic Studies*, (Jul. 2002), 1-37.

Ghatak, Maitreesh, "Exploiting Social Networks to Alleviate Credit Market Failures: On the Endogenous Selection of Peer Groups in Microfinance Programs", (Nov. 9, 2002), 1-10.

Jain, Sanjay, et al., "A little at a time: the use of regularly scheduled repayments in microfinance programs", *Journal of Development Economics* 72, (2003),253-279.

Lensink, Robert, et al., "Risk Behaviour and Group Formation in Microcredit Groups in Eritrea", *CREDIT Research Paper*, No. 03/02, 1-34.

McIntosh, Craig, et al., "Competition and Microfinance", (Jul. 2002),1-36.

Morduch, Jonathan, "The Mircofinance Promise", *Journal of Economic Literature*, vol. XXXVII (Dec. 1999), 1569-1614.

Navajas, Sergio, et al., "Lending Technologies, Competition, and Consolidation in the Market for Microfinance in Bolivia", (Mar. 25, 2002), 1-60.

Okten, Cagla, et al., "Participating in Networks: The Family versus the Community", 1-40.

Park, Albert, et al., "Joint Liability Lending and the Rise and Fall of China's Township and Village Enterprises", *Forthcoming in the Journal of Development Economics*, William Davidson Working Paper No. 462,(Jul. 2001),1-46.

"U.S. Appl. No. 11/135,781, Response dated Jan. 10, 2011 to Final Office Action dated Nov. 10, 2010", 11 pgs.

Said, Carolyn , "Site hooks up lenders, borrowers Prosper.com is an eBay-like online marketplace that lets people seek out, bid on loans", *San Francisco Chronicle*, URL: http://sfgate.com/cgi-bin/article.cgi?file=/chronicle/archive/2006/03/06/BUGCOHIAEP1.DTL,(Mar. 6, 2006),C-1.

\* cited by examiner

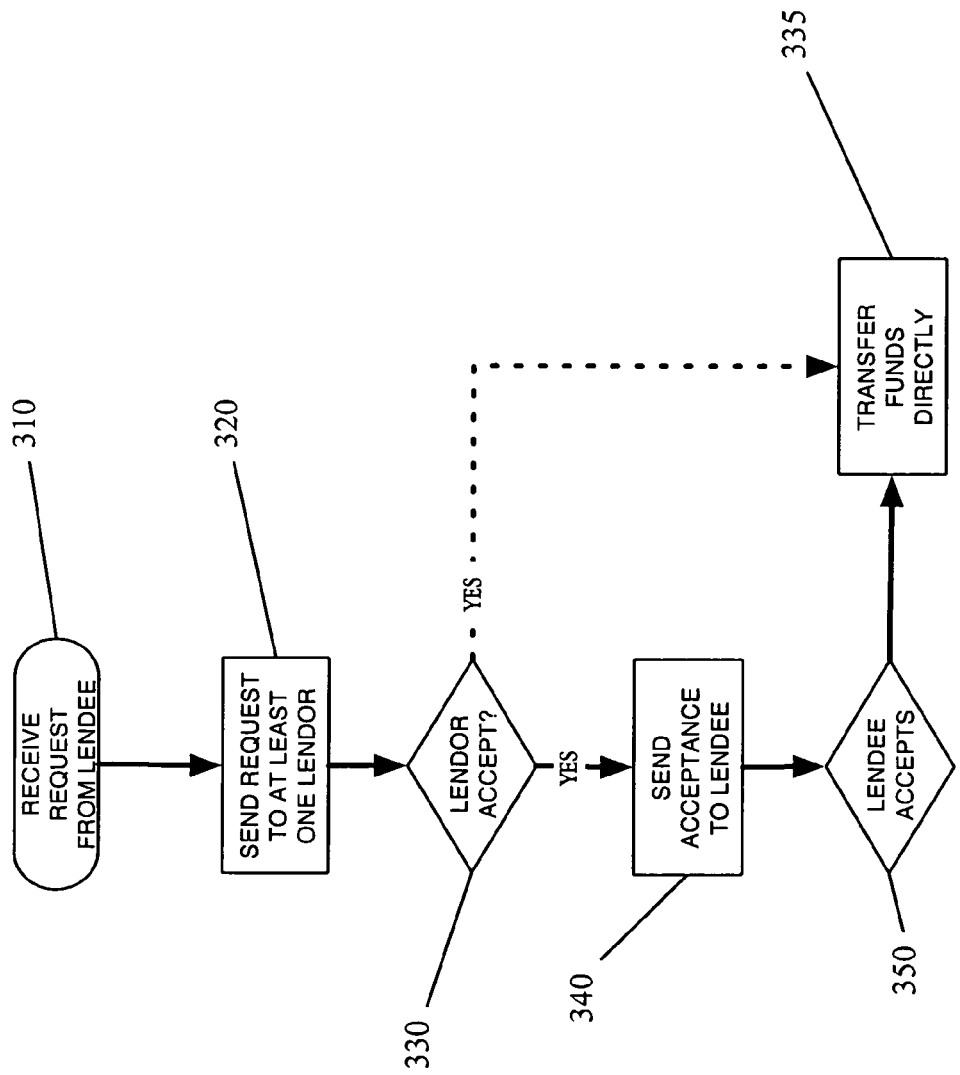

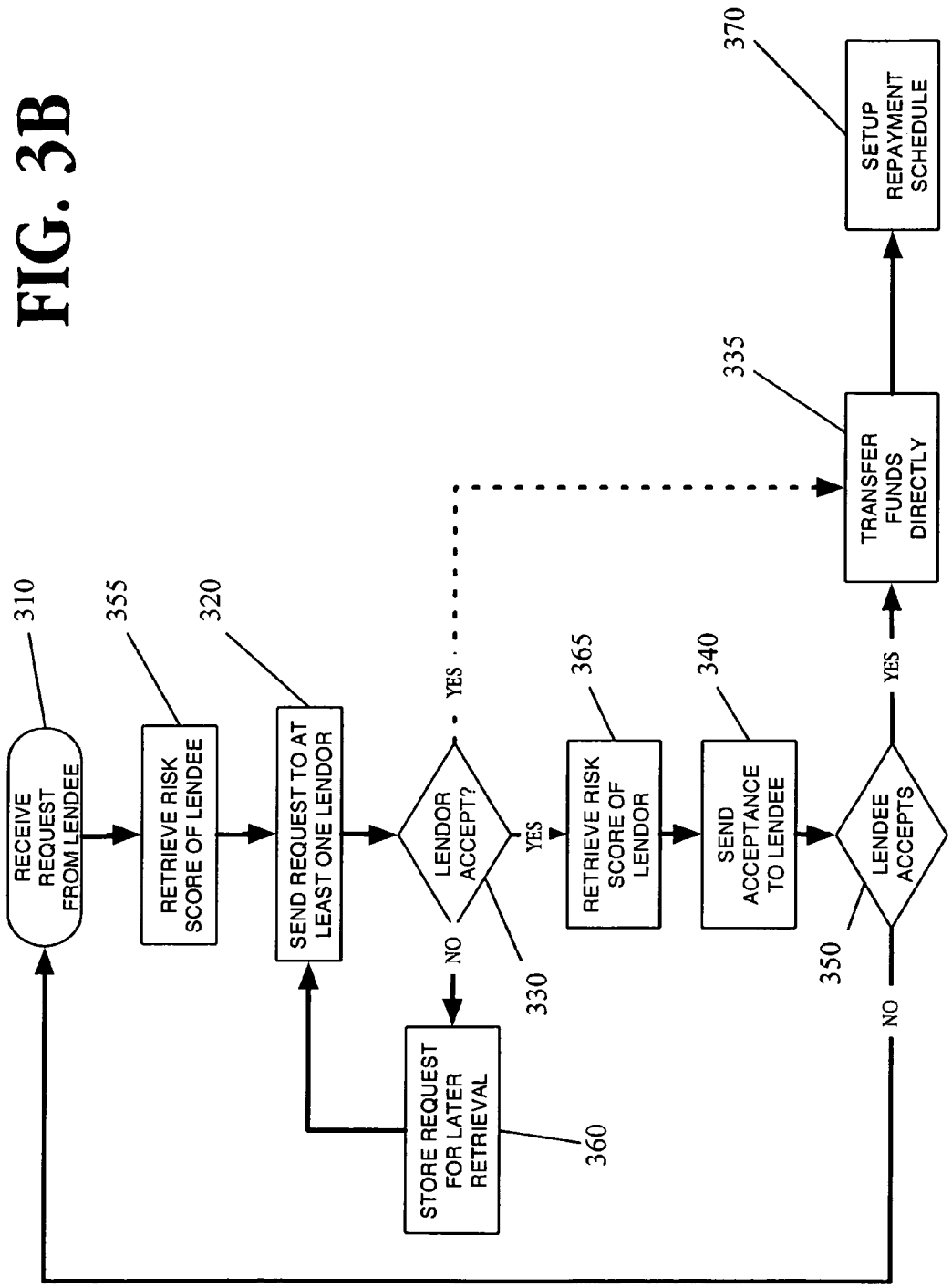

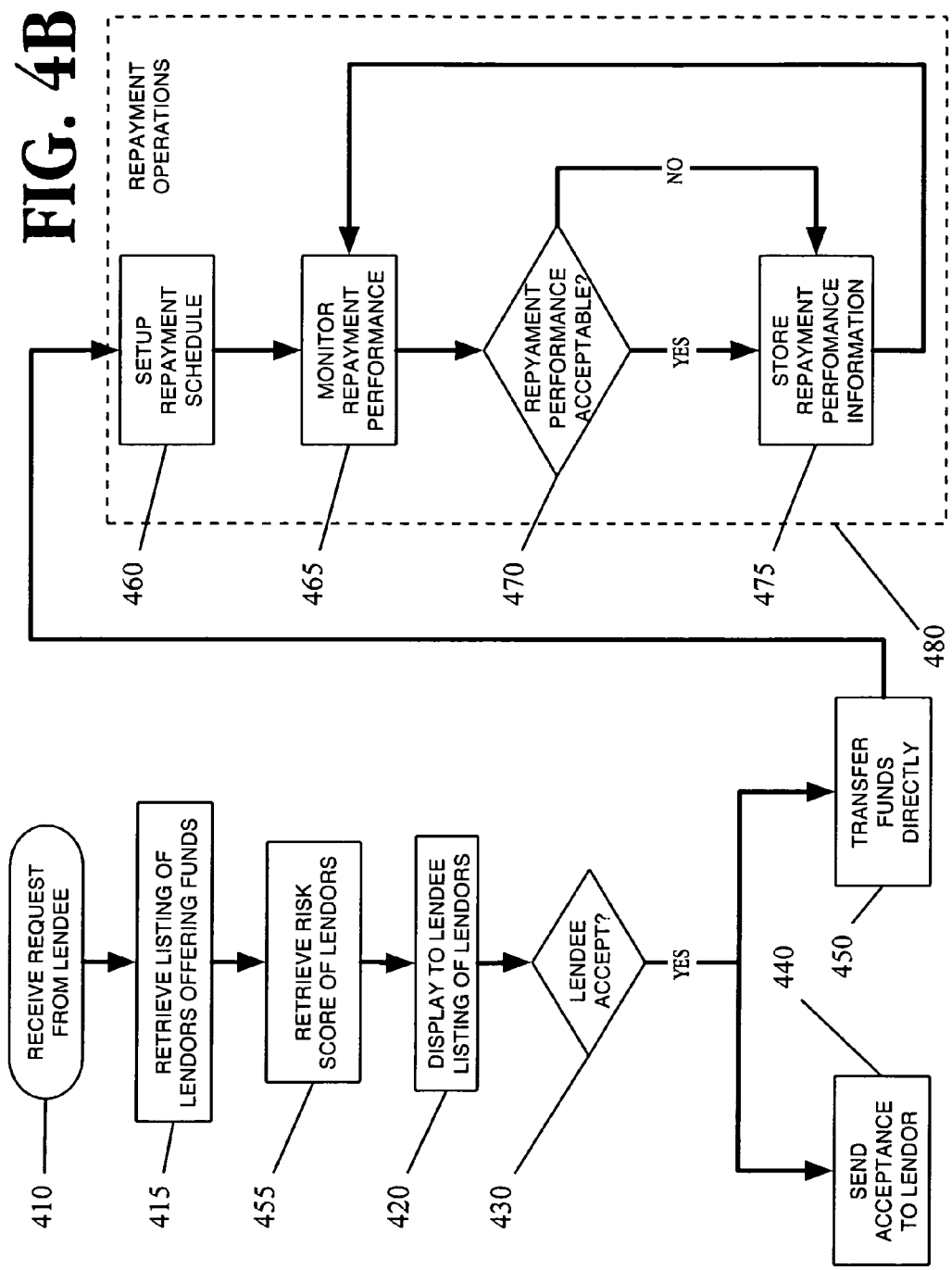

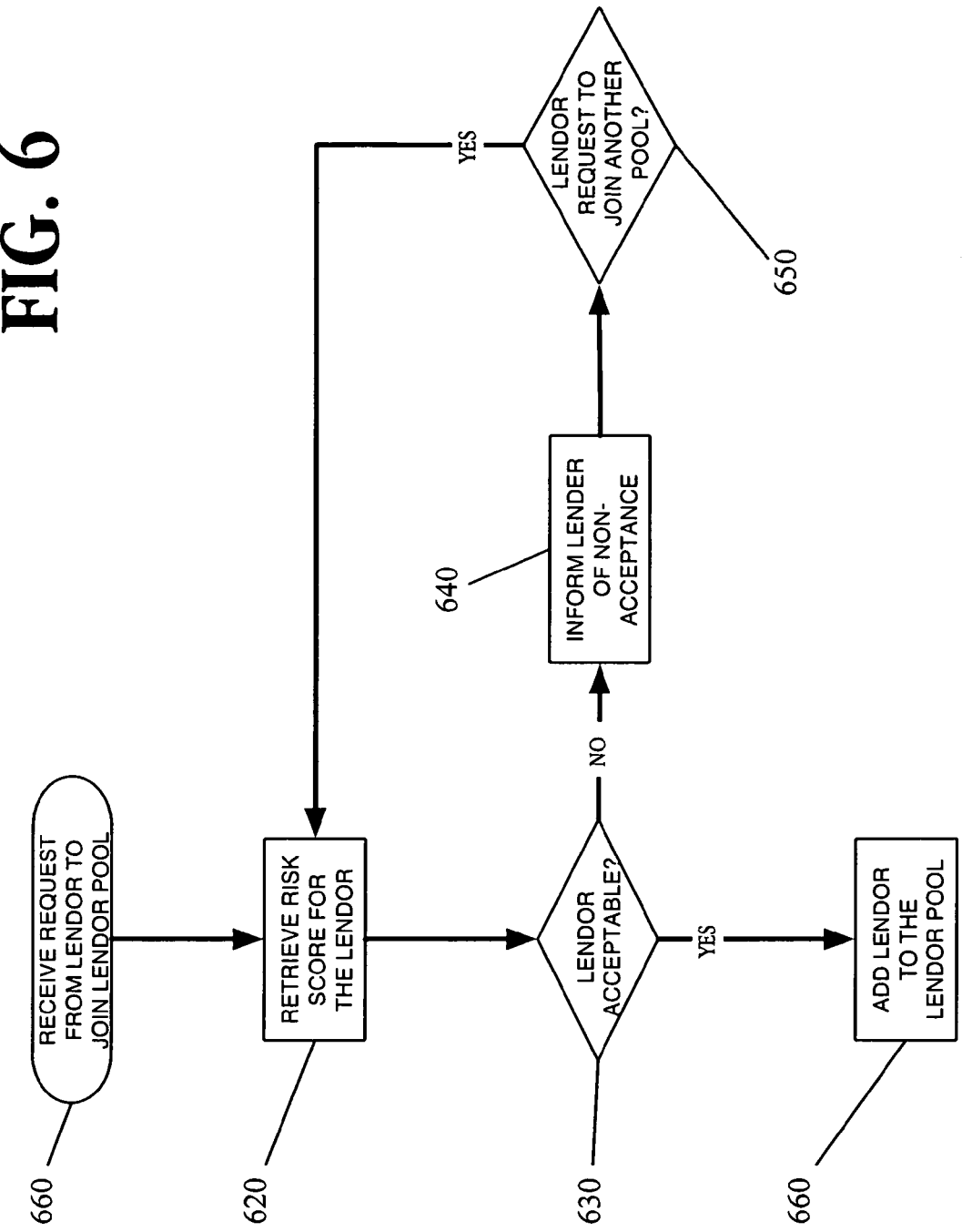

SYSTEMS AND METHODS FOR FACILITATING LENDING BETWEEN TWO OR MORE PARTIES

RELATED APPLICATION

The present application claims the priority benefit of U.S. Provisional Patent Application No. 60/640,937, filed Dec. 30, 2004, the contents of which is incorporated herein by reference.

TECHNICAL FIELD

The present application relates generally to the technical field of systems and methods of electronic commerce (e-commerce), and, in one specific example, to systems and methods for authentication or authorization in a credit or loan processing system for facilitating a loan transaction between two parties.

BACKGROUND

Some of the advantages offered by a typical network-based commerce facility, such as an Internet-based auction facility, are the simplicity, promptness and convenience of participating in the online trading process. Conducting transactions (e.g., using an auction process facilitated by a network-based commerce facility) has become very popular. Demands for using the network-based commerce facility to transact business between private parties have increased drastically.

Many private parties have seen this as an opportunity to participate in online trading both for the sale of items they own, as well as the acquisition of items that interest them. One of the problems associated with online commerce is the monetary satisfaction to both parties. These problems are somewhat overcome with credit cards issued by banking institutions. Before the advent of these types of financial devices society operated on a much more personal basis. In addition to providing financial means to people for the purchase of items necessary for their existence, it also allowed for greater community connectivity. This is lacking in the impersonal transaction where a credit card is used. A direct interaction between two parties is cumbersome and requires trust between users. It also requires a large amount of communications to enable the users to come to lending terms that are amenable to both parties.

What are needed are systems and methods that facilitate an interaction between two or more parties for the purposes of one or more parties lending money to the another.

SUMMARY

According to one embodiment, there is provided a method of facilitating a loan transaction between a lendee and a lender. The method includes receiving a loan request from a lendee, sending the loan request to at least one lender, receiving an acceptance indication from the at least one lender, and transferring the requested funds from a financial account of the lender to a financial account of the lendee.

According to another embodiment, there is provided a method of facilitating a loan transaction between a lendee and a lender. The method includes receiving a request from a lender, retrieving a listing of at least one lendee that matches the received request, displaying the listing to the lender, receiving an acceptance indication from the lender to at least one lendee in the listing and transferring funds from the lender to the lendee.

According to another embodiment, there is provided a method of facilitating a loan transaction between a lendee and a lender. The method includes receiving a request to join at least one lender pool from a lender, evaluating the lender based on the requirements of the at least one lender pool, and adding the lender to the lender pool if the determination is made that the lender is acceptable to the lender pool.

According to another embodiment, there is provided a system to facilitating a loan transaction between a lender and a lendee. The system includes a receiving module to receive requests from at least one lender or lendee. The system further includes a loan facilitation module to process the request connected to a loan facilitation database containing information related to the private parties using the system for the facilitation of loan requests. The database further includes a lendee table, lender table, lender pool table and a repayment table.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 3A is a flowchart illustrating a method of facilitating a loan request from a lendee, according to one embodiment;

FIG. 3B is a flowchart illustrating a method of facilitating a loan request from a lendee, according to one embodiment;

FIG. 4B is a flowchart illustrating a method of facilitating a loan request from a lendee, according to one embodiment;

FIG. 6 is a flowchart illustrating a method of facilitating a request to join a lender pool, according to one embodiment;

DETAILED DESCRIPTION

A method and system to facilitate a loan transaction between two parties, a lender and a lendee in one example, are described. In the following description, for purposes of explanation, numerous specific details are set forth in order to provide a thorough understanding of the present invention. It will be evident, however, to one skilled in the art that the present invention may be practiced without these specific details.

Reference is made in the present application to a lender and a lendee. It is to be understood that a lendee, in the context of the present discussion, is a party that is requesting to borrow some amount of funds through the use of the systems and methods described herein. Lendee may include, without limitation, a private individual, a group of individuals borrowing funds collectively or a company. It is to be further understood that the lender, in the context of the present discussion, is a party that is offering a loan of funds through the use of the systems and methods described here. Lender may include, without limitation, a private individual, a group of individuals collectively offering funds, or a company offering funds for lending. In some embodiments, the company offering funds for lending may include a bank, credit union or other financial institution.

Figure 1:
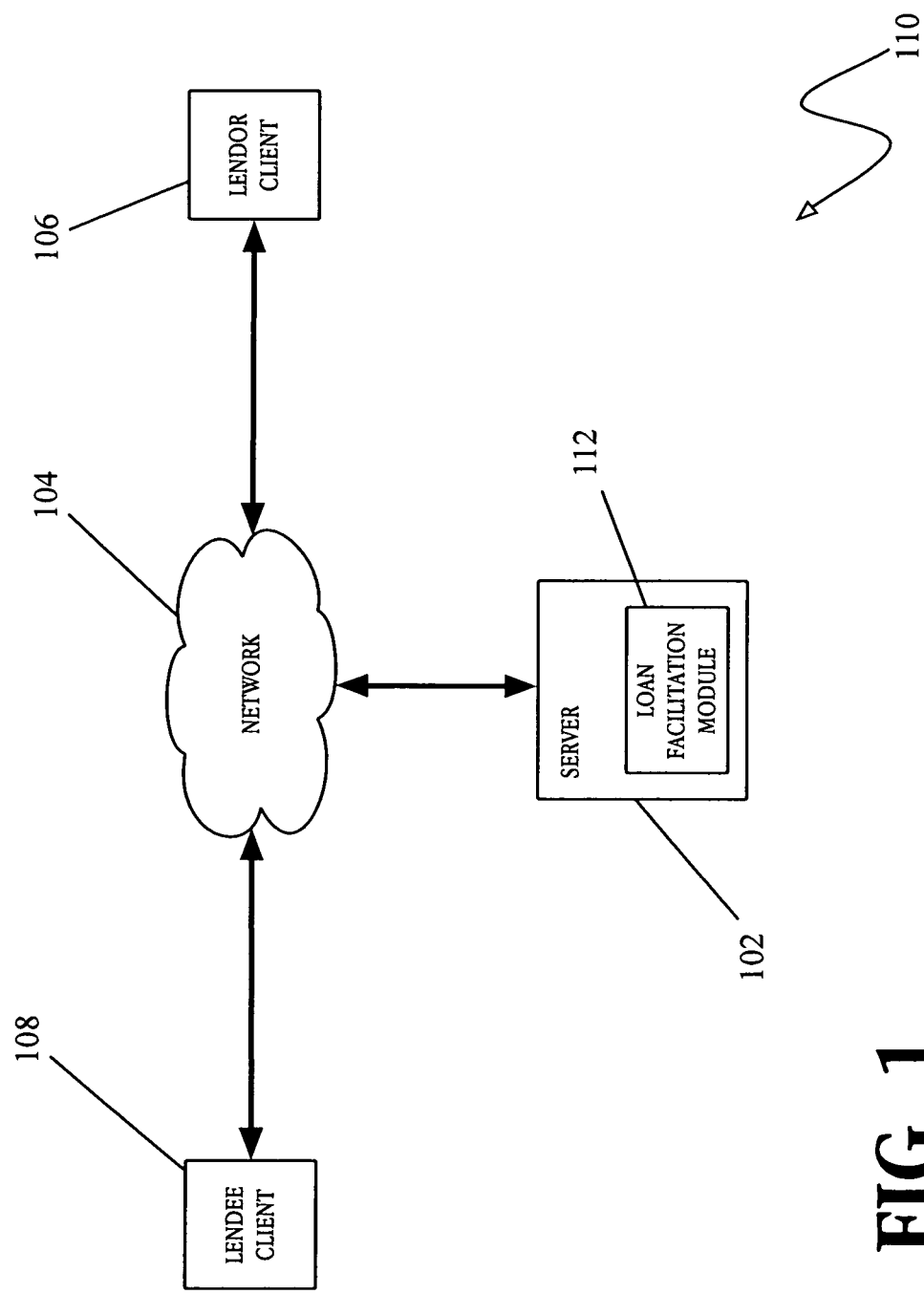
FIG. 1 is a block diagram illustrating an example loan facilitation system, according to one embodiment.

FIG. 1 is a block diagram illustrating an example loan facilitation system 110, according to one embodiment. In an embodiment, a server 102 provides server-side functionality, via a network 104 (such as the Internet or private network) to one or more clients, such as a lender client 106 and a lendee client 108. Though depicted as a client-server architecture, it will be understood to those skilled in the art that the system 110 depicted in FIG. 1 could be implemented in a peer-to-peer relationship, such that the functionality of the server 102 is implemented on either of the clients 106 or 108.

In an embodiment, each of the lender client 106 and lendee client 108 provide an end user with a client application that is configured to send requests to, and receive responses from, the server 102. The client application may be, without limitation, a web browser and/or a client application dedicated to network transactions between the client and the server.

In an embodiment, the server 102 further includes a loan facilitation module 112. The loan facilitation module 112 is configured to receive and process loan requests from private persons requesting the lending of funds, or lendees. In one embodiment, processing loan requests does not include the receipt or disbursement of funds. In another embodiment, processing loan requests may include either the receipt of funds, the disbursement of funds or both the receipt of funds and the disbursement of funds. In an embodiment, the loan facilitation module 112 is not configured to receive funds from lenders or disburse funds to lendees. In another embodiment, the loan facilitation module 112 is configured to receive funds from lenders, disburse funds to lendees or both receive funds from lenders and disburse funds to lendees. The loan facilitation module 112 is further configured to receive and process loan offers from parties offering the lending of funds, or lenders. The loan facilitation module 112 is further configured to maintain information related to the lendees, the lenders, and transactions between the lenders and lendees. In yet another embodiment, the loan facilitation module 112 is configured to issue funds transfer orders to financial institutions, where the funds transfer orders are orders to transfer funds from the lender's financial institution to the lendee's financial institution. In such an example, the funds may not pass through the loan facilitation module, and the operator of the loan facilitation module does not receive funds from the lenders or disburse funds to the lendee. In an embodiment, the loan facilitation module 112 could also be implemented as standalone software program, which does not necessarily have networking capabilities.

In an embodiment, the client application on either of the clients 106 or 108 provides access to the loan facilitation module 112 via a web interface supported by the server 102. In another embodiment, the client application on either of the clients 106 or 108 may provide access to the loan facilitation module 112 via a programmatic interface supported by the server. Though the system 110 depicts a single server 102 containing within it the capabilities described herein, it will be understood by those skilled in the art that such functionality may be divided across multiple servers or devices. Further, the loan facilitation module 112 application may be distributed amongst a plurality of servers, such that the load of loan request and offers are distributed substantially equally across the plurality of servers, otherwise known as load-balancing.

Figure 2:
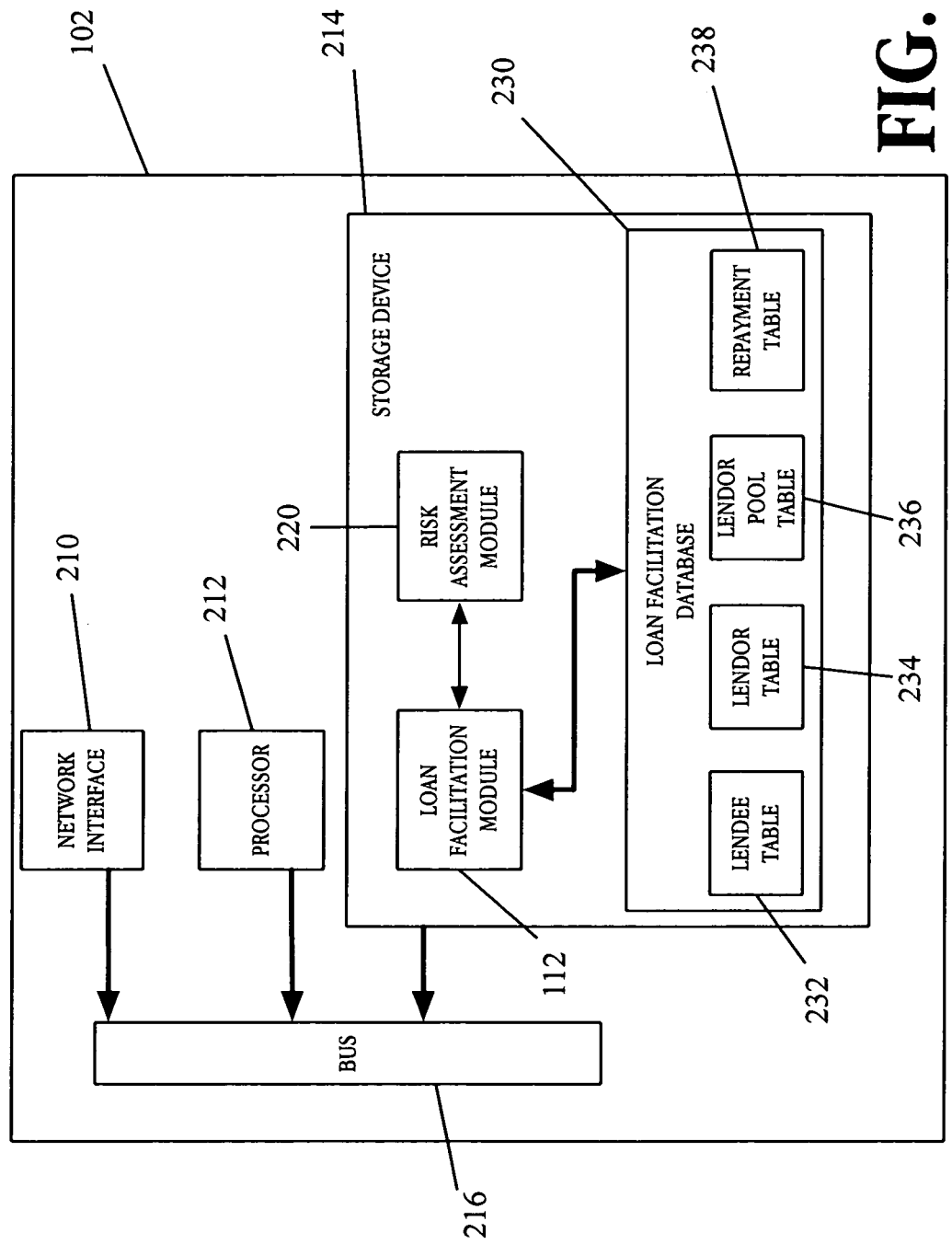
FIG. 2 is a block diagram of a loan facilitation device, such as in FIG. 1, according to one embodiment.

FIG. 2 is a block diagram of a loan facilitation device as in FIG. 1, according to one embodiment. In an embodiment, the device 102 includes a network interface 210, processor 212, storage device 214 and a bus 216. In an embodiment, the bus operably couples the network interface 210, processor 212 and storage device 214. The bus 214 may represent one or more busses, e.g., USB (Universal Serial Bus), FireWire, PCI, ISA (Industry Standard Architecture), X-Bus, EISA (Extended Industry Standard Architecture), or any other appropriate bus and/or bridge (also called a bus controller).

In an embodiment, the storage device 214 contains therein instructions which when executed cause the operation of the loan facilitation module 112. The storage device 214 additionally includes a risk assessment module 220. The loan facilitation module 112 is additionally coupled to a loan facilitation database 230. The loan facilitation database 230 comprises a lendee table 232, lender table 234, lender pool table 236 and a repayment table 238. In an embodiment, the lendee table 232 maintains records related to those users that are requesting the lending of funds, the lender table 234 maintains records related to those users that are offering funds for lending, the lender pool table 236 maintains records of groups of lenders that are collectively offering funds for lending, and the repayment table 238 maintains records related to the repayment of funds previously loaned.

FIG. 3A is a flowchart illustrating a method of facilitating a loan request from a lendee, according to one embodiment. At block 310 the loan facilitation module 112 receives a loan request from a lendee. At block 320, the loan request is sent to at least one lender, the lender being retrieved from the lender table 236 of the loan facilitation database 230. The lender previously registered their intent to lend funds to other users accessing the loan facilitation module 112. In an embodiment, the lender makes an offer for the lending of funds, wherein the offer is similar to that of an auction listing. In an embodiment, the loan facilitation module 112 at block 320 will first match the loan request received from the lendee at block 310 to a loan offer that substantially matches the requirements of the loan request. In an embodiment, requirements of the loan request may include, without limitation, amount of money request, time period to pay the loan back, interest rate desired, and the like. At block 320 an indication of the loan request is sent to the at least one lender. In an embodiment, the indication includes without limitation, a real-time indication on a web browser, an email sent directly to the lender, a message that the lender can retrieve on a next login to the loan facilitation system, and the like.

In an embodiment, the lender includes a lender pool. A lender pool is a group of lenders that are offering funds for lending. In one embodiment, the funds offered from each of the lenders is not collectively offered for lending. In such an example, a lendee requesting an amount of money from a lender pool is in practical operation requesting a fraction of the total amount from each lender. For example, if the lendee is requesting $100 US and the lender pool they are requesting it from has 10 lenders, the lendee is in practical operation, requesting $10 US from each of the lenders. Financial transactions between a lendee and members of a lender pool are individual transactions. In another embodiment, the funds offered from each of the lenders is collectively offered for lending. In such an example, each of the lenders makes some amount of funds available for lending which is aggregated with the funds from other members of the lending pool.

In an embodiment, the lender indicates their acceptance at block 330 through a means similar to the indication of the request. For example, the lender can indicate their acceptance at block 330 by selecting the loan from a web page display in their web browse, by sending a reply e-mail, or by logging into the loan facilitation system and indicating their acceptance. Upon acceptance by the lender at block 330, the loan facilitation module 112 sends that acceptance indication to the lendee at block 340. In another embodiment, the acceptance by the lender of the terms of the loan request results in a transfer of funds from a financial account of the lender to a financial account of the lendee at block 335. In another embodiment, the lendee at block 350 is provided a further opportunity to accept the transaction. In such an example, provision is made for the lender to modify the terms of the loan request in their acceptance indication received at block 330.

In an embodiment, when the loan request is to a lender pool, each member of the lender pool must indicate their acceptance of the loan request. In another embodiment, one or more members of the lender pool indicate their acceptance of the loan request. In such an example, the amount of funds requested are divided by the number of members of the lender pool that accept the terms of the loan request.

In one embodiment, at block 335, the funds requested are transferred from the financial account of the lender directly to the financial account of the lendee. Directly, within the context of the present discussion, is meant to denote a monetary transaction wholly between a lender and a lendee. The monetary transaction may be ordered by a third party, in the present case the loan facilitation module, but the actual transaction is between the lender and the lendee. In such an example a traditional lending institution is not needed for the receipt, holding or disbursement of funds associated with a loan transaction as discussed here. Any transaction directly between a lendee and a lendor without a third party handling the receipt, holding or disbursement of funds associated with a loan transaction is considered to be a within the scope of transferring directly regardless of the terminology used. In an alternate embodiment, the funds may be received from the lender by a system such as the loan facilitation module 112 and disbursed directly from the loan facilitation module 112 to the lendee. A traditional lending institution, for the purposes of the present discussion is any institution that as a business objective lends funds to individuals or businesses. Examples of traditional lending institutions include, without limitation, banks, credit unions, microfinance institutions and the like. Additionally, any institution that is regulated by a government entity with respect to consumer or business lending is considered within the scope of this definition. In the United States, for example, these institutions would be regulated at the federal level by the Federal Deposit Insurance Corporation for the purposes of consumer protection. In an embodiment, the loan facilitation module 112 directs the transfer of funds, but at no time are funds transferred to the operator of the systems described in FIG. 1 and FIG. 2. In another embodiment, the loan facilitation module 112 may receive funds from the lender that are to be disbursed directly to the lendee. In such an example, the operator of the systems described in FIG. 1 and FIG. 2 would receive a transfer of funds from the lender and transfer those funds directly to the lendee. In this example, the operator of the system may charge an additional monetary fee for those operations.

In another embodiment, in the context of a loan request from a lendee to a lender pool, the amount of funds transferred from each of the individual members of the lender pool will be determined by the total amount requested and the number of members. In an alternate embodiment, the number of members is the number of members that indicate their acceptance of the terms of the loan request. An amount of funds equal to the total amount requested divided by the number of members will be transferred directly from the financial account of each of the members directly to the financial account of the lender.

FIG. 3B is a flowchart illustrating a method of facilitating a loan request from a lendee, according to one embodiment. FIG. 3B is similar to FIG. 3A with the addition several operations. In an embodiment, subsequent to the loan request being received from the lendee at block 310, a risk score is retrieved at block 355 for the lendee requesting the loan. The risk score is an assessment of the lendee's trustworthiness. Trustworthiness may include, without limitation, propensity to repay a loan, ability to repay a loan, or other non-monetary factors. This may be based on at least one or more of the following, without limitation, past repayment history, current credit rating, other party's reviews of the lendee, credit limit of at least one of the lendee's credit cards, type of financial account used (checking, credit card, savings, etc.) or other financial information supplied by the lendee. In a further embodiment, additional information may be used to determine the risk score such as background criminal checks, interviews with people connected to the lendee and the like. In yet another embodiment, information regarding the propensity of the lendee to repay a loan may be obtained from the lendee's performance with regards to online auctions. In a further embodiment, the risk score may include reputation information, e.g. feedback left by other lenders or lendees regarding the person in either a lender or lendee capacity. Examples of reputation information include the feedback rating from www.ebay.com, personal or business rating from www.overstock.com, or seller feedback rating from www.amazon.com. Reputation information may also include general information about the party's dealings with others, such as responsiveness to communications. Though the term risk score, or assessment information, is used, this is not meant to be limiting in any manner and any measure of the trustworthiness of the party as outlined above is considered to be within the scope of the present discussion without regard to the terms used. In a further embodiment, the reputation information may be obtained from a source external to the loan facilitation module 112. The external source may include, without limitation, ebay.com's feedback rating.

In an embodiment, the loan request sent to at least one lender at 320 contains information regarding the risk score of the lendee. This provides the lender a useful indicator of whether the present lendee will repay the amount requested. In an embodiment, a provider of loan facilitation services as outlined here maintains no fiduciary responsibility to the lender and the lendee in the transaction being presently discussed, such that the lendee's default on a previously loaned amount of money does not obligate the provider to provide monetary satisfaction to the lender who has been defaulted on.

In an embodiment, if the lender does not accept the loan request at block 330, the loan request is stored for later retrieval at block 360. In another embodiment, the loan request is sent to another lender at block 320, proceeding as outlined above.

In an embodiment, following acceptance of the loan request by the lender at block 330, a risk score is retrieved for the lender at block 365. The risk score of the lender is a quantitative measure of the ability and propensity to transfer the funds request. The risk score of the lender can be determined similarly to that of the lendee, with the addition of a verification that the lender has funds sufficient to cover the requested amount of funds in their financial account. At block 340 the retrieved risk score of the lender is included in the acceptance sent to the lendee. This provides the lendee a final ability to accept the terms of the loan request. In one example, the risk score may provide to the lendee a factor of comfort in that the lender has loaned funds previously and has received very positive reviews from other lendees. In another example, the lendee may choose not to go ahead with the loan request based on the risk score of the lender as that risk score indicates that the lender has dealt very poorly with lendees previously. In such a situation the lendee will indicate their non-acceptance at block 350, and be provided the opportunity to initiate another loan request at block 310.

In an embodiment, the funds from the financial account of the lender are directly transferred in accordance with the terms of the accepted loan request to the financial account of the lendee at block 335 as discussed above. Following transfer or funds at block 335, a repayment schedule is set up at block 370. In one embodiment, the repayment schedule is contained wholly in the accepted loan request. In another embodiment, the repayment schedule is determined after the loan request has been accepted. In yet another embodiment, the repayment schedule is modified at some point in the future. In an embodiment, the repayment schedule is stored in the repayment table 238 of the loan facilitation database 230.

In facilitating the loan repayment, the loan facilitation module 112 facilitates a direct transaction between the lender and the lendee. In such an example, as the time for repayment of one of the installments as outlined in the repayment schedule comes due, the loan facilitation module 112 will issue a funds transfer order from the financial account of the lendee to the financial account of the lender. As discussed above, the operator of the loan facilitation module 112 does not receive funds from the lendee for disbursement to the lender, but merely issues the order for the transfer of funds as outlined in the repayment schedule.

Figure 4A:
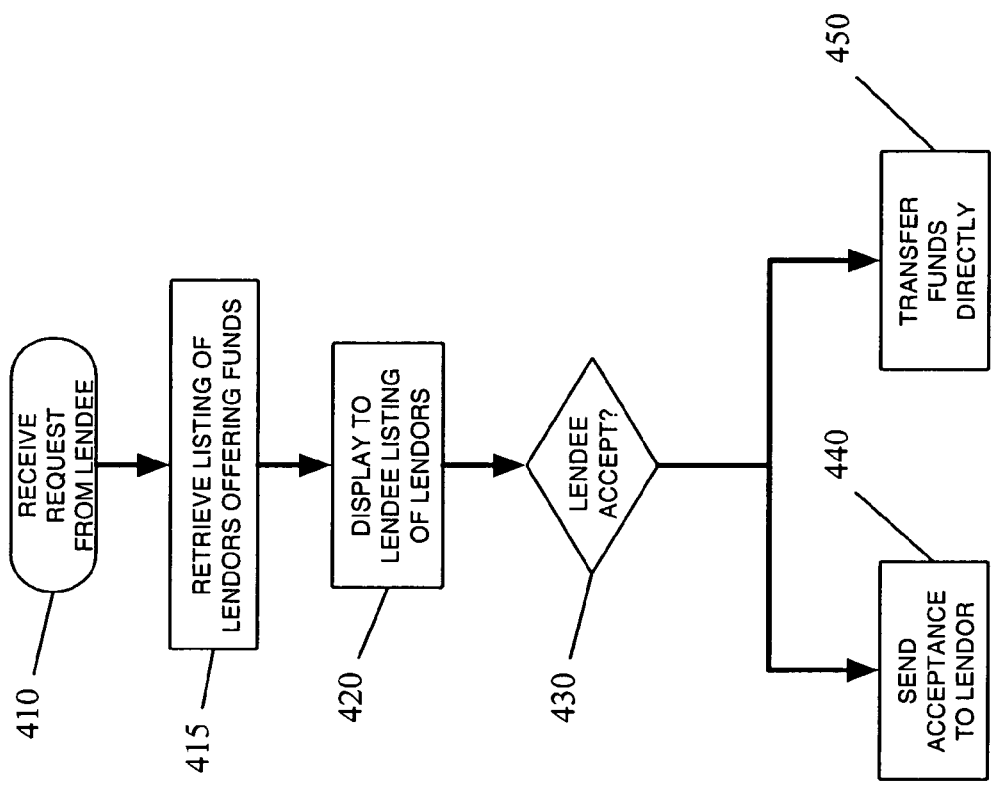
FIG. 4A is a flowchart illustrating a method of facilitating a loan request from a lendee, according to one embodiment.

FIG. 4A is a flowchart illustrating a method of facilitating a loan request from a lendee, according to one embodiment. At block 410 a request for a loan is received from a lendee by the loan facilitation module 112. The loan facilitation module 112 searches the lender table 236 and retrieves a listing of lenders that substantially match at least one of the terms of the loan request at block 415. In another embodiment, the listing of lenders is a listing of lender pools, or a grouping of lenders that are collectively offering funds. Such an example is a way for the lenders to distribute the risk associated with lending money amongst more then one lender. In one embodiment, the listing of lenders is ordered by risk score, with low risk lenders being ordered first in the listing. In another embodiment, the listing of lenders is ordered by some other measure requested by the user, such as physical proximity to the lendee. At block 420 the listing of lenders is displayed to the lendee. In another embodiment, the listing of lenders contains information including, but not limited to, reputation information, lending history, participation in lender pools and the like. Such additional information provides the lendee information from which to make a more informed choice as to the lender. The lendee indicates their acceptance of one lender in the listing of lenders at block 430. At block 440 notification of the acceptance is sent to the lender. In one embodiment, the lender is not provided an opportunity to finally accept the loan request. In another embodiment, the lender is provided an opportunity to finally accept the loan request. At block 450 the funds are transferred directly in accordance with the loan request from the financial account of the lender to the financial account of the lendee.

In an embodiment, the lender displayed to the lendee requesting funds is a pool of lenders. In such an example, a direct transaction between each of the members of the lender pool and the lendee is facilitated by the loan facilitation module 112. The amount of each of these transactions can be expressed as the total amount of funds requested divided by the number of members such that the sum of all direct transactions between individual members and the lendee would be for the total amount of funds requested by the lendee. In another embodiment, at block 450 the funds are transferred from a collective financial account of the lender pool to the financial account of the lendee.

FIG. 4B is a flowchart illustrating a method of facilitating a loan request from a lendee, according to one embodiment. FIG. 4B is similar to FIG. 4A with the addition of several operations. Following the retrieval of the listing of vendors at block 415, a risk score for each of the lenders in the listing is additionally retrieved at block 455. In a further embodiment, the lenders include lender pools. In an embodiment, the risk score is displayed with the listing of lenders at block 420.

FIG. 4B also depicts operations concerning the repayment of the requested loan. In an embodiment, subsequent to the transfer of funds at block 450 a repayment schedule is set up at block The repayment schedule is stored in a repayment table 238 of a loan facilitation database 230 accessible to the loan facilitation module 112. The repayment schedule specifies the amount and periodicity of payments to be made from the financial account of the lendee to the financial account of the lender. In another embodiment, the loan facilitation module 112 is configured to apply an interest rate to the loaned funds. For example, if the interest rate specified in the loan request is 20% per annum, the amount of funds loaned is $100 US and the repayment term is monthly over a period of one year, the loan facilitation module 112 will add 20% of $100, or $20 to the initial loan amount, and compute a monthly repayment amount of $10. The example is a simple application of interest rates to a loan, and is not meant to be taken in a limiting manner. Other methods of interest rate application are well known to those skilled in the art, and any method is considered to be within the scope of the present discussion for the purposes of computing and setting up a repayment schedule.

As discussed above, the repayment is a direct transaction between the lendee and the lender, such that the funds needed to comply with the prepayment terms are transferred directly from the financial account of the lendee to the financial account of the lender. In one embodiment, a particular payment amount as directed by the repayment schedule will be used by the loan facilitation module 112 to generate a funds transfer order. The funds transfer order will direct the financial institution of the lendee to transfer those funds to the financial account of the lender. As discussed above, the loan facilitation module 112 and the operator of the loan facilitation module will not receive, hold or disburse these funds.

At block 465 the loan facilitation module 112 monitors the repayment performance of the lendee. This includes, without limitation, whether the lendee has made a timely payment, if the lendee has paid more then the minimum amount, or if the lendee has paid the full loaned amount earlier then what had been set up in the repayment schedule. At block 470 the loan facilitation module 112 determines if the repayment performance is acceptable. The repayment performance is acceptable if it is in accordance with the terms of the loan request and the repayment schedule. If the repayment performance is not in accordance with the terms of the loan request or the repayment schedule, the repayment performance is deemed unacceptable at block 470. The determination made at block 470 is stored at block 475 in the repayment table 238 of the loan facilitation database 230. In another embodiment, if the determination at block 470 is that the repayment performance is unacceptable, the loan facilitation module 112 may perform other operations to include, without limitation, notifying the lender of the unacceptable repayment performance, acceleration of the repayment schedule, email or phone contact with the lender, and the like. Collectively, the operations from block 460 to block 475 may be called repayment operations 480 and may be used, in some embodiments, by other methods in the present application where a loan amount is being repaid by a lendee to a lender.

Figure 5A:
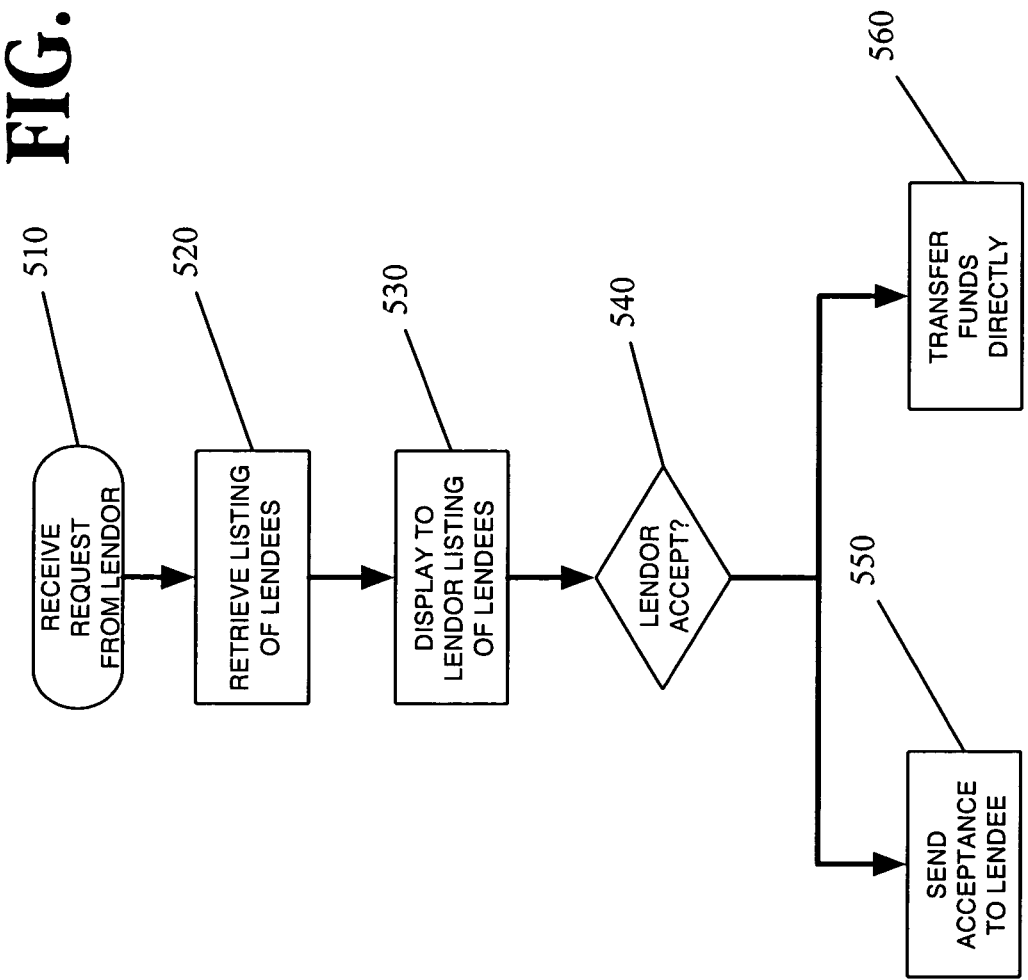
FIG. 5A is a flowchart illustrating a method of facilitating a loan offer from a lender, according to one embodiment.

FIG. 5A is a flowchart illustrating a method of facilitating a loan offer from a lender, according to one embodiment. At block 610 a lending request is received from a lender. At block 520 a listing of lendees that have a lending loan request in the loan facilitation table 230 that substantially matches the lending request is retrieved. At block 530 the listing is displayed to the lender. In an embodiment, the listing is ordered in some manner, such as by the physical proximity of the lendee to the lender or the amount of monies requested by the lendee in the loan request. In another embodiment, the listing is ordered by the risk score of the lendee. The lender at block 540 selects at least one of lendees and indicates their acceptance. In an embodiment, the lender may accept the loan requests of more then one lendee at one time. A notification of the lender's acceptance is sent to the lendee at block 550 and the funds are transferred as discussed above at block 560.

Figure 5B:
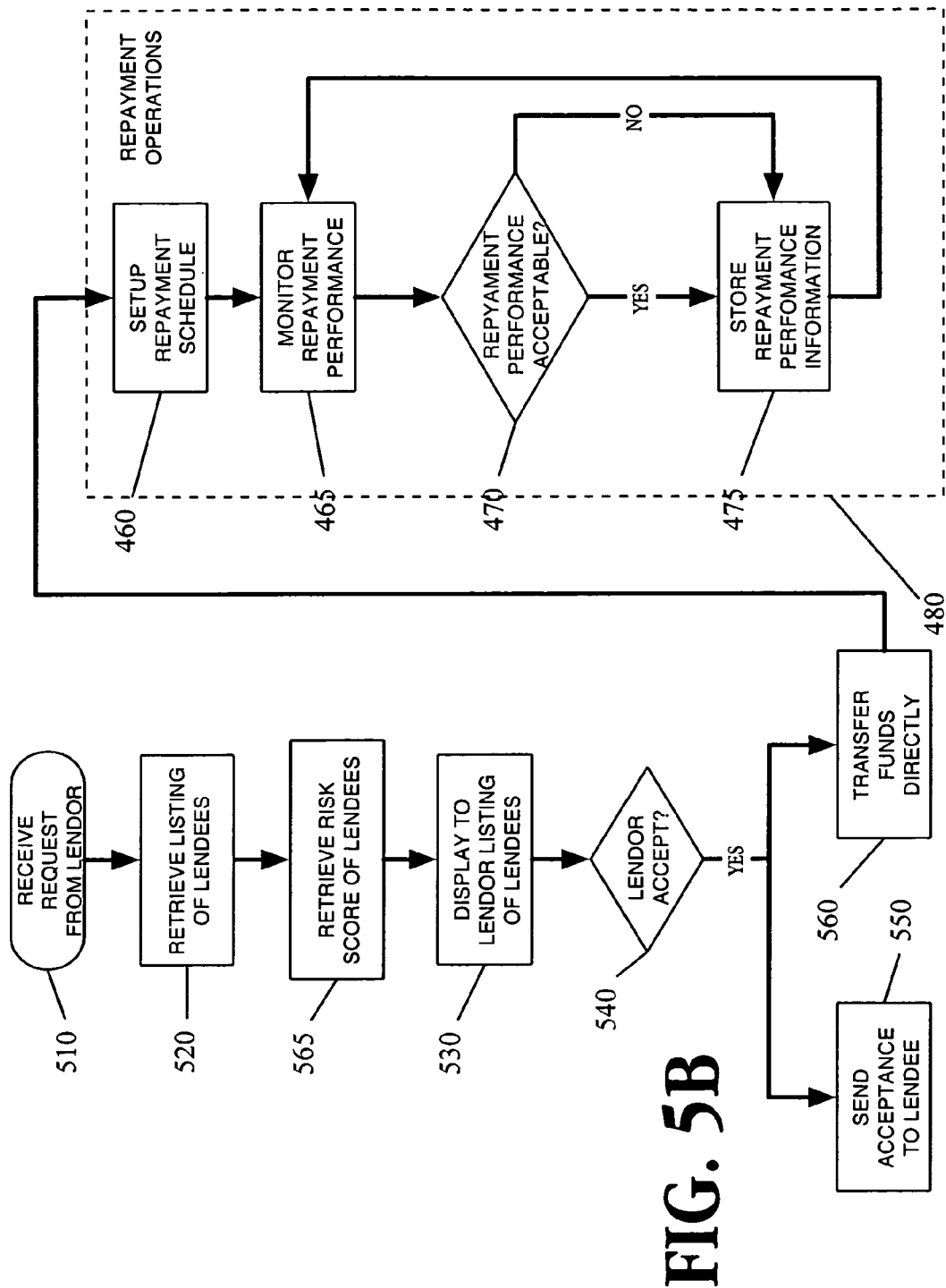
FIG. 5B is a flowchart illustrating a method of facilitating a loan offer from a lender, according to one embodiment.

FIG. 5B is a flowchart illustrating a method of facilitating a loan offer from a lender, according to one embodiment. FIG. 5B is similar to FIG. 5A with the addition of an operation at block 565 and repayment operations 480 after the funds are transferred at block 560. At block 565, a risk score is retrieved for each of the lendees in the listing of lendees retrieved at block 520. In an embodiment, reputation information is retrieved in addition to the risk score. At block 530, the risk score for each of the lendees is displayed to the lender. Additionally the risk score may be used to order the listing of lendees displayed at block 530. Subsequent to the direct transfer of funds at block 560, repayment operations 480 to facilitate and monitor repayment proceed substantially the same as discussed above with respect to FIG. 4B.

FIG. 6 is a flowchart illustrating a method of facilitating a request to join a lender pool, according to one embodiment. As discussed above, a lender may form part of a lender pool. In an embodiment, a lender pool is a grouping of individual lenders, in which the grouping collectively offers loans to lendees. In such an example, the risks associated with lending funds are distributed amongst each of the lenders in the lender pool. Additionally, the risks for a lendee are distributed as well and a lendee may be more comfortable borrowing money from a lender pool then an individual lender. FIG. 6 depicts operations associated with a lender requesting to join a lender pool.

At block 610 the loan facilitation module 112 receives a request to join a lender pool from a lender. In another embodiment, the request is to join more then one lender pool. In an embodiment, the request contains information regarding the amount of money that the lender agrees to provide to the lender pool. At block 620 a risk score for the lender is retrieved from the loan facilitation table 230. In one embodiment, the lender is evaluated with respect to the lender pool requested. The evaluation is based at least in part on the retrieved risk score as well as the amount of monies offered for lending by the lender. At block 630 a determination is made as to the acceptability of the lender for at least one lender pool. If the lender is determined to be unacceptable at block 630, the lender is informed of such determination at block 640. In an embodiment, the lender is queried at block 650 if they wish to join another lender pool. If the response is yes, operations return to block 620 and proceed as above. If the lender is determined to be acceptable at block 630, the lender is added to the lender pool at block 660 and information regarding the lender is added to the lender pool table 236.

In another embodiment, the evaluation of the lender with respect to the lender pool is an evaluation of the closest match between the lender and any of a plurality of lender pools. In such an example, the lender is displayed a listing of lender pools that they can be added to based on the evaluation. The listing of lender pools can be ordered in any manner for display to the lender, such as the amount of money required to participate in the lender pool.

Figure 7:
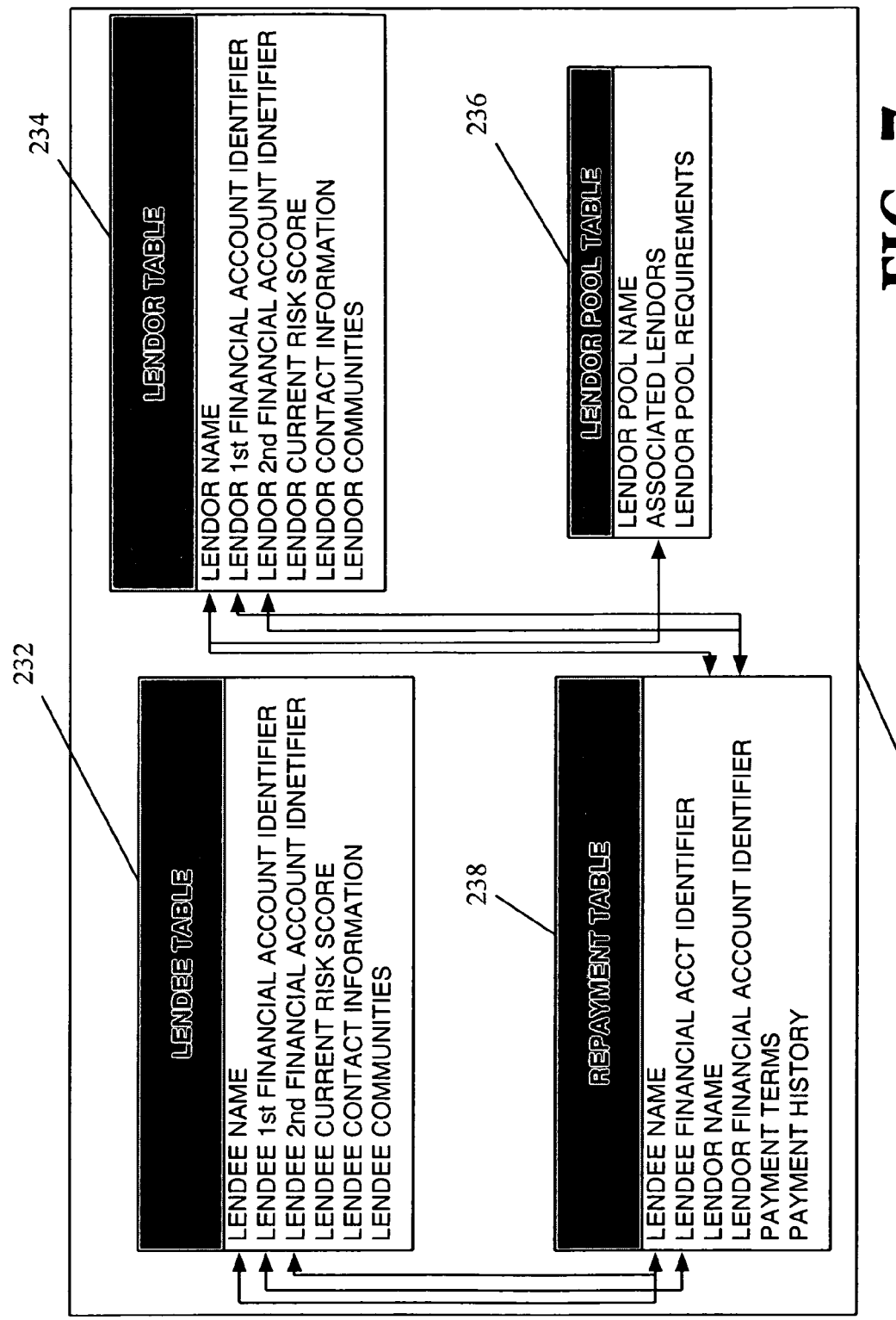
FIG. 7 is a database diagram illustrating an example embodiment of a database, maintained by and accessed via a loan facilitation module, which at least partially implements and supports the loan facilitation system, according to one embodiment.

FIG. 7 is a database diagram illustrating an example embodiment of a database, maintained by and accessed via a loan facilitation module, which at least partially implements and supports the loan facilitation system, according to one embodiment. In an embodiment, the loan facilitation database 230 includes a lendee table 232, lender table 234, lender pool table 236 and a repayment table 238. The loan facilitation database 230 contains information accessible to the loan facilitation module 112.

In an embodiment, the lendee table 232 and the lender table 234 contain similar information. Information contained in these tables includes, without limitation, name, $1^{st}$ financial account identifier, $2^{nd}$ financial account identifier, current risk score and contact information. Additionally, the tables may contain information in regards to the communities of which the person in involved in. Communities reflect the other users that are connected in some manner to the present person. These may be transactional parties (the lender for a current loan with respect to a lendee), self-identified parties (the present user supplying information as to other users), or third-party identified (the third party user supplying information as to the present user), etc. These communities can provide a basis for modifying the risk score of a particular lender or lendee. Such modification may be positive, in that the users in the community have very good risk scores, so the present user's risk score is increased an amount that would not be in accordance with the present user's actual risk score. The modification may also be negative, in that some users in the community have poor risk scores, and the present user's risk score is decreased accordingly. Additionally, if one of the member's in the user's community has unacceptable repayment performance, all the members in that user community would have their risk score modified accordingly. It will be understood by those skilled in the art, that an individual may have an entry in either the lender table 234 or the lendee table 232 as they may be loaning money in one instance and borrowing money in another. In another embodiment, the lender table 234 and the lendee table 232 are combined into a single table, so that double entries are avoided.

In an embodiment, the lender pool table 236 maintains information regarding pools of lenders. The table 236 may include, without limitation, a name of the lender pool, the lenders that are currently members of that group and the requirements for inclusion in the lender group. In an embodiment, the requirements for inclusion are used by the loan facilitation module 112 to evaluate a lender and determine if that lender is acceptable to the lender pool, such as at block 630 in FIG. 6. Requirements for inclusion may include, without limitation, risk score, lending ability, reputation information, location, lending history, and the like.

In an embodiment, the repayment table 238 maintains information regarding loans that are currently being repaid by a lendee. The repayment table 238 includes, without limitation, lendee name, lendee financial account identifier, lender name, lender financial account identifier, repayment terms, and repayment history.

While the machine-readable medium is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to facilitate loan transactions between lender and lendee have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of operating a facilitation server in an custom optimized database environment, the method comprising:
   receiving, at the facilitation server from an individual who is a lendee client, a request for an amount pooled from multiple sources;
   the facilitation server accessing a database having a customized data organization scheme comprising the database having a combined lendee/lendor table, a lendor pool table, and a repayment table, the repayment table linked to the combined lendee/lendor table via multiple shared database fields, wherein the lendee/lendor table is configured so that double entries are avoided for an individual having both lendee and lendor status within the database;
   based on the accessing, creating a particular entry for the lendee client in the combined lendee/lendor table of the database, the particular entry including a first of a plurality of data fields that corresponds to the request and including a second of the plurality of data fields that corresponds to generalized information regarding the lendee that is not specific to the request for the amount;
   based on the request, accessing at least first and second ones of a plurality of member entries in the lendee/lendor combined table of the database to determine a plurality of member clients of a lender pool, the first and second member entries being configured to store particular member information for a first member client of the lender pool and a second client member of the lender pool, the particular member information usable by the facilitation server to facilitate both borrowing and lending decisions for the first and second member clients, the combined lendee/lendor table being configured to store the particular member information without duplication across multiple tables of the database;
   sending the request to a plurality of lender clients via the network, the plurality of lender clients comprising the plurality of member clients of the lender pool;
   determining, at a facilitation module of the facilitation server, one or more requirements of the request corresponding to respective offers provided by respective lender clients and member clients;
   receiving, by the receiving module, a first acceptance from the first member client of the lender pool and a second acceptance from the second member client of the lender pool; and
   based on receiving at least the first acceptance and the second acceptance, causing the facilitation module to:
      initiate a first direct transfer of a first fund amount from a first account of the first member client to an account of the lendee client;
      initiate a second direct transfer of a second fund amount from a second account of the second member client to the account of the lendee client; and
      cause the lendee client to display an indication of the first direct transfer from the first member client and the second direct transfer from the second member client.

2. The method of claim 1, further comprising:
   sending a notification to the lendee client that indicates the first acceptance and the second acceptance, wherein the notification is displayed by the lendee client.

3. The method of claim 1, further comprising:
   retrieving assessment information for the lendee client; and
   sending the request to the plurality of lender clients, wherein the request includes the assessment information of the lendee client.

4. The method of claim 3, wherein the assessment information includes reputation information pertaining to the lendee client, and wherein the reputation information is displayed by the plurality of lender clients.

5. The method of claim 2,
   wherein the first acceptance and the second acceptance received includes assessment information for the first member client and the second member client.

6. The method of claim 1, further comprising:
   determining if at least a third member client of the lender pool accepts terms of the request; and
   storing the request for later retrieval if the third member client of the member pool does not accept the terms of the request.

7. The method of claim 1, further comprising:
configuring a repayment schedule, wherein the repayment schedule identifies repayment terms, wherein the repayment terms include at least one of the following:
the account of the lendee client;
the first account of the first member client and the second account of the second member client;
periodicity of repayments of the repayment schedule; and
contact details of the first member client, the second member client, and the lendee client.

8. The method of claim 7, further comprising:
transferring an amount less than the first amount directly from the account of the lendee to the first account of the first member client based on the repayment schedule.

9. The method of claim 8, further comprising:
monitoring repayment performance of the lendee client;
determining if the repayment performance of the lendee client is in accordance with the repayment terms; and
storing the determined repayment performance.

10. The method of claim 1, wherein the first fund amount is substantially equal to the second fund amount to satisfy the request.

11. A non-transitory machine-readable medium having stored thereon machine-readable instructions executable to cause a machine to perform operations comprising:
receiving, from an individual who is a lendee client, a request for an amount pooled from multiple sources;
accessing a database having a customized data organization scheme comprising the database having a combined lendee/lendor table, a lendor pool table, and a repayment table, the repayment table linked to the combined lendee/lendor table via multiple shared database fields, wherein the lendee/lendor table is configured so that double entries are avoided for an individual having both lendee and lendor status within the database:
based on the accessing, creating a particular entry for the lendee client in the combined lendee/lendor table of the database, the particular entry including a first of a plurality of data fields that corresponds to the request and including a second of the plurality of data fields that corresponds to generalized information regarding the lendee that is not specific to the request for the amount;
based on the request, accessing at least first and second ones of a plurality of member entries in the lendee/lendor combined table of the database to determine a plurality of member clients of a lender pool, the first and second member entries being configured to store particular member information for a first member client of the lender pool and a second client member of the lender pooh the particular member information usable by the facilitation server to facilitate both borrowing and lending decisions for the first and second member clients, the combined lendee/lendor table being configured to store the particular member information without duplication across multiple tables of the database;
sending the request to a plurality of lender clients via the network, the plurality of lender clients comprising the plurality of member clients of the lender pool;
determining one or more requirements of the request corresponding to respective offers provided by respective lender clients and member clients;
receiving, by the receiving module, a first acceptance from the first member client of the lender pool and a second acceptance from the second member client of the lender pool; and
based on receiving at least the first acceptance and the second acceptance, causing the machine to:
initiate a first direct transfer of a first fund amount from a first account of the first member client to an account of the lendee client;
initiate a second direct transfer of a second fund amount from a second account of the second member client to the account of the lendee client; and
cause a display at the lendee client of an indication of the first direct transfer from the first member client and the second direct transfer from the second member client.

12. The non-transitory machine-readable medium of claim 11, the operations further including:
displaying on a computer display of the lendee client a listing of the plurality of lender clients that substantially matches at least one requirement of the request;
receiving an acceptance indication from the lendee client of the lender client within the listing of the plurality of lender clients; and
sending the request to the lender client within the listing of the plurality of lender clients.

13. The non-transitory machine-readable medium of claim 11, wherein the first fund amount is substantially equal to the second fund amount to satisfy the request.

14. A system, comprising:
a processor;
a network interface device; and
a storage device having stored thereon instructions executable to cause the system to perform operations comprising:
receiving, from an individual who is a lendee client, a request for an amount pooled from multiple sources;
accessing a database having a customized data organization scheme comprising the database having a combined lendee/lendor table, a lendor pool table, and a repayment table, the repayment table linked to the combined lendee/lendor table via multiple shared database fields, wherein the lendee/lendor table is configured so that double entries are avoided for an individual having both lendee and lendor status within the database:
based on the accessing, creating a particular entry for the lendee client in the combined lendee/lendor table of the database, the particular entry including a first of a plurality of data fields that corresponds to the request and including a second of the plurality of data fields that corresponds to generalized information regarding the lendee that is not specific to the request for the amount:
based on the request, accessing at least first and second ones of a plurality of member entries in the lendee/lendor combined table of the database to determine a plurality of member clients of a lender pool, the first and second member entries being configured to store particular member information for a first member client of the lender pool and a second client member of the lender pooh the particular member information usable by the facilitation server to facilitate both borrowing and lending decisions for the first and second member clients, the combined lendee/lendor table being configured to store the particular member information without duplication across multiple tables of the database;
sending the request to a plurality of lender clients via the network, the plurality of lender clients comprising the plurality of member clients of the lender pool;

determining one or more requirements of the request corresponding to respective offers provided by respective lender clients and member clients;

receiving, by the receiving module, a first acceptance from the first member client of the lender pool and a second acceptance from the second member client of the lender pool; and based on receiving at least the first acceptance and the second acceptance:

initiating a first direct transfer of a first fund amount from a first account of the first member client to an account of the lendee client;

initiating a second direct transfer of a second fund amount from a second account of the second member client to the account of the lendee client; and causing a display at the lendee client of an indication of the first direct transfer from the first member client and the second direct transfer from the second member client.

* * * * *